P. EDTBAUER.
AUTOMATIC WEIGHING MACHINE.
APPLICATION FILED DEC. 31, 1908.
943,012.
Patented Dec. 14, 1909.
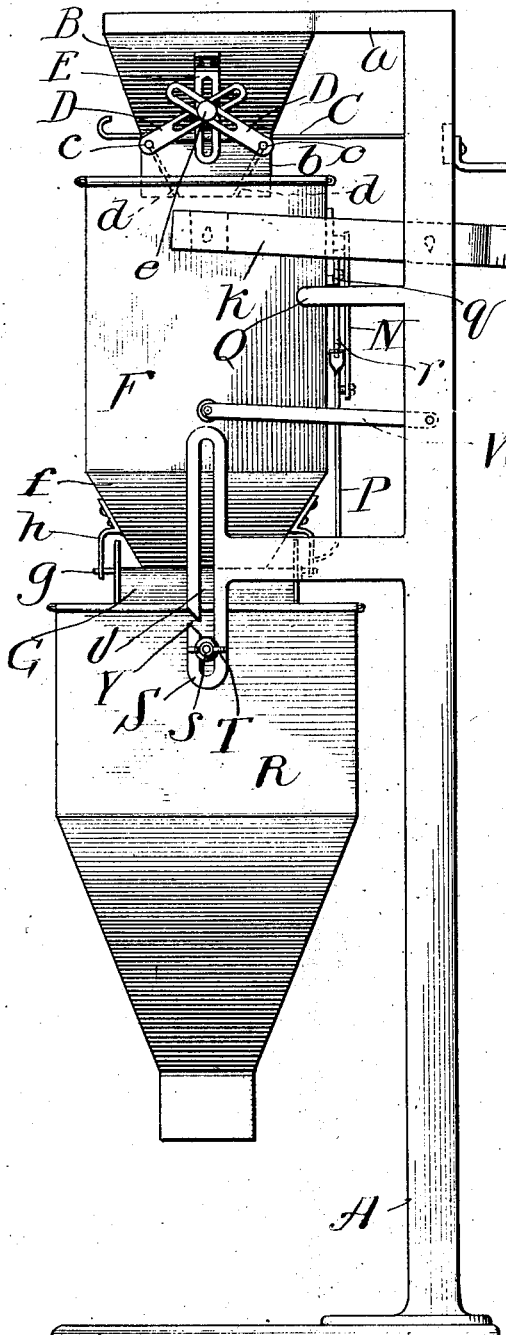
Fig. 1.
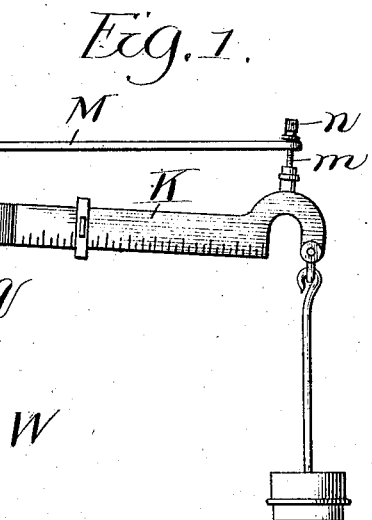
Fig. 2.
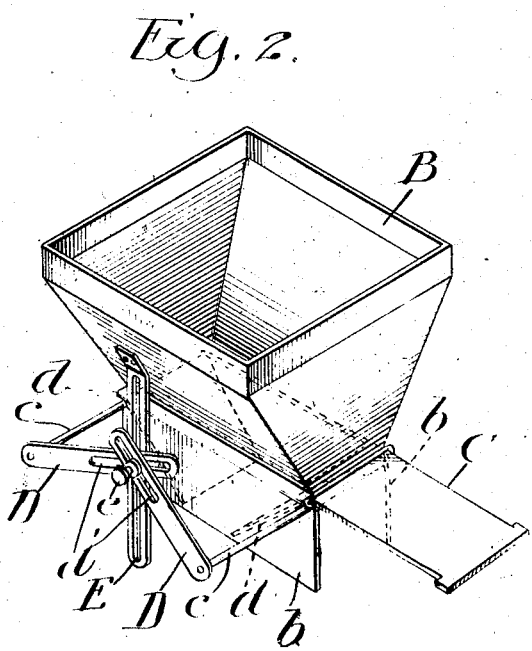
Inventor
Petronella Edtbauer.
by Frank D. Thomason
Atty.
Witnesses:
O. M. Ummel
E. Lundy P. EDTBAUER.
AUTOMATIC WEIGHING MACHINE.
APPLICATION FILED DEC. 31, 1908.
943,012.
Patented Dec. 14, 1909.
2 SHEETS—SHEET 2.
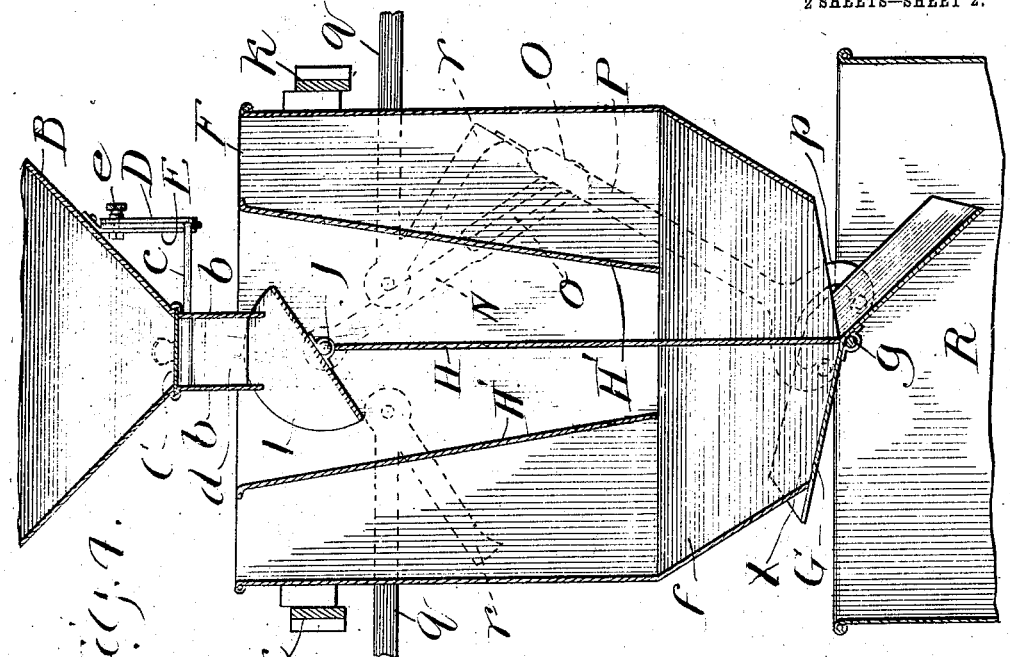
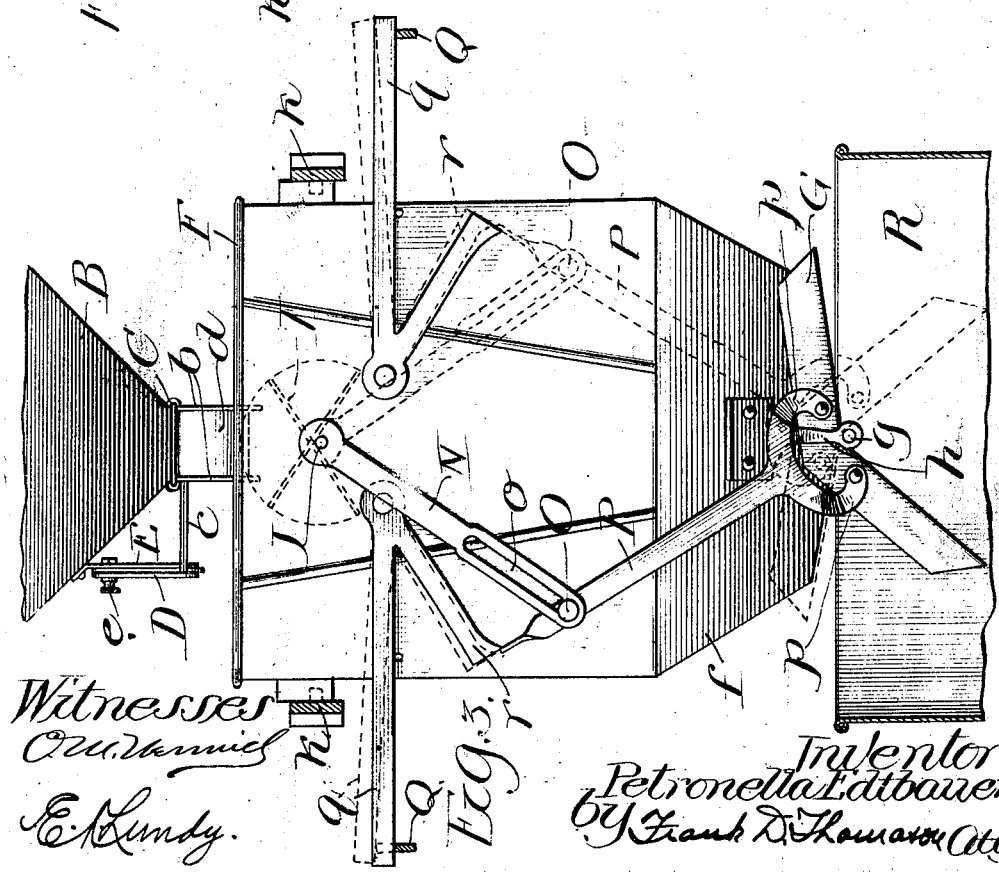
Witnesses
O. W. Vannice
E. Lundy.
Inventor
Petronella Edtbauer.
by Frank D. Thomason Atty

UNITED STATES PATENT OFFICE.

PETRONELLA EDTBAUER, OF CHICAGO, ILLINOIS.

AUTOMATIC WEIGHING-MACHINE.

943,012.  Specification of Letters Patent.  Patented Dec. 14, 1909.

Application filed December 31, 1908. Serial No. 470,161.

*To all whom it may concern:*

Be it known that I, PETRONELLA EDTBAUER, a citizen of the United States, and a resident of Chicago, in the county of Cook and State of Illinois, have invented certain new and useful Improvements in Automatic Weighing-Machines, of which the following is a clear, full, and exact description.

My invention relates to automatic weighing machines which, when set to measure a quantity of a given commodity by weight, will repeat the weighing process as long as the supply of the commodity lasts unless sooner stopped.

The object of my invention is to make the movement of the centrally divided weighing receptacle actuate the mechanism that simultaneously drops the bottom of one compartment thereof and closes the bottom of the other, and vice versa; to provide simple mechanism for controlling the size of the discharge opening of the overhead hopper and direct the discharge therefrom into the center of the weighing receptacle, and to so simplify the construction of the actuating mechanism of the machine as to greatly reduce the cost thereof and insure its satisfactory operation. This I accomplish by the means hereinafter fully described, and as particularly pointed out in the claims.

In the drawings:—Figure 1 is a front elevation of my invention. Fig. 2 is a perspective view of the segregated hopper used in connection with the same. Fig. 3 is a side elevation of the weighing receptacle of the machine, showing fragmentary portions of the hopper and funnel thereof, and drawn to a larger scale. Fig. 4 is a transverse vertical section of the portions of the machine shown in Fig. 3.

Referring to the drawings A represents the standards of the supporting-frame of my invention, which, at their upper ends are provided with horizontal arms that, for a short distance from the standards, bend toward each other and then extend parallel and support a suitable hopper B between them. The sides of the hopper B depending below arms $a$ converge toward each other, and the lower edges of the longitudinal sides thereof are provided with corresponding downward projecting aprons $b$, $b$. At the point where these aprons attach to the hopper they are provided with horizontal guide-ways for the accommodation of the longitudinal edges of a longitudinally reciprocal slide C, which latter consists of a flat plate the length of which is, preferably, about twice the length of the hopper, and which is provided with a suitable opening therein, shown in dotted lines, Fig. 2, corresponding to the opening in the bottom of the hopper. Immediately below slide C, the aprons $b$, $b$ are provided at each end with suitable bearings for the transverse rock shaft $c$, $c$, which, between said aprons $b$, $b$, have corresponding rectangular leaves $d$ projecting therefrom that direct the current of the commodity falling from said hopper always into the center of said weighing receptacle. These leaves $d$ are moved nearer to or farther from each other, according as desired by means of arms D, D, projecting from corresponding ends of said shafts $c$ toward each other at the same angle to the plane of the leaves $d$. The upper portions of arms D have longitudinal slots $d'$ therein and said arms are secured together by a thumb-screw $e$ passing through said slots and through the vertical slot of a hanging frame E, located in the vertical plane midway between shafts $c$, $c$, and having its upper end secured to the adjacent end of the hopper. By loosening the thumb-screw and moving it up or down in frame E, arms, D, will be moved and the leaves correspondingly moved to or away from each other.

Receptacle or bin, F, into which the commodity from the hopper discharges, has, preferably, a rectangular upper portion or body, and a lower portion $f$ the sides of which converge toward each other. The lower edges of the inclined sides of said lower portion define the sides of an opening X in the bottom of said bin, and the front and rear of these lower edges are inclined downward from each end to a point intersected by the vertical plane located midway between the sides of the bin. This opening X is closed first on one side and then on the other of the longitudinal vertical plane located midway between the sides of bin F, by a rocking-chute G, which latter is mounted upon a shaft $g$, journaled in the lower ends of hangers $h$ depending from suitable plates attached to the outer surface of the front and rear of said inclined sides, and, this chute G has its floor inclined downward on each side of shaft $g$, and has its longitudinal sides provided with opposite flanges that are outside of the edges of discharge opening X, substantially as shown. The length of chute G is greater than the length of said discharge opening, and when it is rocked to the limit of its movement in one direction, it closes one-half of said discharge opening and opens the other half thereof.

Bin F is divided into two equal compartments by a longitudinal vertical partition H located in the vertical plane striking longitudinally through the axis of the shaft $g$, and it extends upward from the lowest point of the lower transverse edges of said discharge-opening to a point near the upper edges of said bin. Immediately above the upper end of this partition, and in the same longitudinal plane thereas, there is a rocking-shaft J whose ends are journaled and extend through bearings in the side-walls of bin F, and securely mounted upon this shaft J is a tilting-chute I that is adapted to tilt or incline toward and discharge the commodity flowing into it, first into one compartment of bin F and then into the other.

The bin F is carried by and between the parallel arms $k$ or bifurcations forming one-half of a graduated balance-beam K, which latter is fulcrumed by having knife-edged trunnions projecting from arms $k$ near their shoulders. The portion of said beam opposite the bin is graduated and otherwise constructed substantially like the balance beam of the ordinary scales, excepting that the back of the hooked end thereof is provided, at its highest point, with a boss, that has an upwardly projecting screw $m$ that extends freely through a suitable perforation in the end of an overhanging arm M, projecting from a plate connecting the upper ends of standards A. The upper end of screw $m$ has a thumb nut $n$ mounted thereon, by properly manipulating which the extent of the vibration of the beam K can be regulated.

When the weight of the commodity in bin F is sufficient to overbalance the graduated part of the beam, said bin will move downward, and it is this downward movement that is utilized to rock the rocking-chute G, and permit the discharge of the compartment, in which the desired weight of commodity has accumulated, and to close the other one, and at the same time rock the tilting-chute so as to prevent further accessions to the full compartment and direct the commodity (falling from the hopper) into the compartment just closed. To accomplish this I secure on the end of shaft J nearest the standard, depending arm N, that extends downward at right angles to the plane of the floor of the chute I a suitable distance, and has its lower portion provided with a longitudinal slot $o$. This slot is engaged by headed stud or screw, O, projecting from an upper end of an arm P projecting up from the rocking-chute G. The lower end of this arm P has inwardly hooked bifurcations or legs, $p$, $p$, the extremities of which are bent toward and secured to the adjacent upwardly flanged edge of said chute G at such points on each side of its pivot that said arm O will extend upward at right angles to a horizontal plane connecting the ends of said chute. Thus when said chute G is at the limit of its movement in one direction, arm P will incline toward one side of the plane of the partition H, and when the chute is at the limit of its movement in the opposite direction the arm P will incline at about the same angle to the opposite side of said partition. The upper extremity of arm P, above stud O, is bent substantially at right angles to the portion below the same, to provide a flat blade, the extremity of which is adapted to be engaged by one or the other of the vibrating trips, which latter are arranged in the same horizontal plane, and one of which is pivoted to the side of the bin F on one side of the vertical plane of partition H, and the other of which is pivoted a corresponding distance on the other side of said vertical plane. These trips have a horizontal branch $q$ that extends from the pivot thereof away from the vertical plane of the partition to points beyond the sides of the bin a suitable distance and rest upon horizontal arms Q projecting from standards A, substantially as shown. Said trips also have a shorter branch $r$ that inclines downward radially from the pivot thereof, such a distance that when arm P moves toward and arrives at the limit of its movement in one direction, the blade at the upper end of said arm will be engaged by the extremity of said branch and prevented from moving in the reverse direction until the compartment on the other side of the partition has accumulated sufficient measure of the commodity to cause the bin F to move downward. When bin F moves downward the engagement of the branches $q$ of the trip with arms Q, will move the trips upward on their pivots sufficient to raise the branch $r$ in touch with arm P out of engagement with the same whereupon the gravity of the commodity being weighed in the compartment on the side of the partition opposite arm P will rock chute G to the limit of its movement in the opposite direction and arm P will move to the other limit of its throw, thus permitting the commodity to be discharged from the recently laden compartment, and enable the bin F to move upward so that the upper extremity of arm P will, while in transit, push past the under edge of the extremity of the branch $r$ of the opposite trip and its return movement be prevented by coming in contact with the edge of the extremity thereof. This action of the weighing bin, F, and the means for affecting the alternate closure of the discharge openings of its two compartments, and causing the discharge from the overhead hopper to flow first into one closed compartment and then the other, will continue as long as there is sufficient flow of the commodity, or until the same is stopped.

The commodity discharged from receptacle F empties into a funnel R that is supported by means of lateral studs s projecting from near its upper edge, that extend through a vertical slot v in the vertically disposed end portion of T-shaped arms S projecting from the standards A, substantially as shown. The outer portions of these studs s are threaded and engaged by thumb-nuts T, by means of which the funnel may be adjusted to any vertical position desired. In order to facilitate the removal of the funnel from under the weighing bin when desired I have provided the vertical members of the T-shaped arms S with an offset slot or channel V, out through which the studs s can be easily removed. To prevent the receptacle F from rocking during the operation of the machine I connect the same by links W to the standards A, thus permitting the vertical movement of said receptacle but preventing any radial movement thereof.

I do not desire to be confined to the exact construction of the essential features of the weighing machine to which my improvements are applied as they may be changed without departing from the spirit of my invention.

I have provided each compartment of the bin with a vertically disposed partition H', which is designed to reduce the dimensions of the part of the compartment into which the tilting chute discharges, when it is desired to weigh, say, one half of the quantity which it would require the employment of the entire compartment to weigh. This is done so that as the volume of the commodity increases during the process of weighing the plane of its upper surface will rise very near to the tilting chute, it having been ascertained from experiment that the best results are accomplished by so doing. The vertically disposed edges are fitted in suitable retaining grooves so that they can be slid in or out as desired, and in order to prevent the overhead hopper interfering with its withdrawal I prefer to slant it away from the central partition H so that its upper edge will be farther from partition H than its lower edge, substantially as shown.

What I claim as new is:—

1. A weighing machine comprising a balance-beam, a vertically vibratory bin divided by a vertical partition into two equal compartments having discharge openings in their bottoms, a rocking-chute adapted to open one and close the other of said openings alternately, an arm projecting upward from said chute at an angle striking midway between the oppositely inclined portions thereof and two independent trips each consisting of a horizontal branch and a downward inclined portion pivoted at their angle of convergence to the side of said bin and engaging the upper end of said arm to retain it at the limit of its movement and stationary means independent of said bin for actuating said trips.

2. A weighing machine comprising a balance beam, a bin carried thereby and divided by a vertical partition into two equal compartments each having a discharge opening in its bottom, a tilting chute having a journal that extends beyond its bearings in the bin, and which is adapted to discharge first on one side and then the other of said partition, an arm depending downward from said journal, a rocking-chute adapted to open one and close the other of said openings alternately, an arm projecting upward and articulated with said first mentioned arm, and trips pivoted to the side of said bin and engaging the upper end of said upwardly projecting arm, and means for actuating said trips.

3. A weighing machine comprising a balance beam, a bin carried thereby and divided by a vertical partition into two equal compartments each having a discharge opening in its bottom, a tilting chute having a journal that extends beyond its bearings in the bin, and which is adapted to discharge first on one side and then the other of said partition, an arm depending downward from said journal, a rocking-chute adapted to open one and close the other of said openings alternately, an arm projecting upward and articulated with said first mentioned arm, and trips pivoted to the side of said bin and engaging the upper end of said upwardly projecting arm, and stationary means independent of said bin for actuating said trips.

4. A weighing machine comprising a balance beam, a bin carried thereby and divided by a vertical partition into two equal compartments each having a discharge opening in its bottom, a tilting chute having a journal that extends beyond its bearings in the bin, and which is adapted to discharge first on one side and then the other of said partition, an arm depending downward from said journal, a rocking-chute adapted to open one and close the other of said openings alternately, an arm projecting upward and articulated with said first mentioned arm, and two independent trips pivoted to the side of said bin and engaging the upper end of said upwardly projecting arm, and means for actuating said trips.

5. A weighing machine comprising a balance beam, a bin carried thereby and divided by a vertical partition into two equal compartments each having a discharge opening in its bottom, a tilting chute having a journal that extends beyond its bearings in the bin, and which is adapted to discharge first on one side and then the other of said partition, an arm depending downward from said journal, a rocking-chute adapted to open one and close the other of said openings alternately, an arm projecting upward and articulated with said first mentioned arm, and trips consisting of a horizontal branch and a downward inclined portion pivoted at one end to the side of said bin and engaging the upper end of said upwardly projecting arm, and stationary means independent of said bin for actuating said trips.

6. A weighing machine comprising a hopper, having a suitable regulating valve in it bottom, transverse shafts below and at each end of the openings closed by said valve, leaves projecting from said shaft below the same, and adjusting devices for simultaneously moving said leaves toward or from each other at substantially the same angle, in combination with a weighing machine comprising a balance-beam, a vertically vibratory bin divided by a vertical partition into two equal compartments having discharge openings in their bottoms, a rocking-chute adapted to open one and close the other of said openings alternately, an arm projecting upward from said chute at an angle striking midway between the oppositely inclined portions thereof, and trips pivoted to the side of said bin and engaging the upper end of said arm to retain it at the limit of its movement and means for actuating said trips.

7. A weighing machine comprising a hopper, having a suitable regulating valve in its bottom, transverse shafts below and at each end of the opening closed by said valve, leaves projecting from said shafts, arms projecting from corresponding ends of shafts that are slotted longitudinally and cross each other, and devices for securing said arms in their adjusted position, in combination with a weighing machine comprising a balance-beam, a vertically vibratory bin divided by a vertical partition into two equal compartments having discharge openings in their bottoms, a rocking-chute adapted to open one and close the other of said openings alternately, an arm projecting upward from said chute at an angle striking midway between the oppositely inclined portions thereof, and trips pivoted to the side of said bin and engaging the upper end of said arm to retain it at the limit of its movement and means for actuating said trips.

8. A weighing machine comprising a hopper, having a suitable regulating valve in its bottom, transverse shafts below and at each end of the opening closed by said valve, leaves projecting from said shafts, arms projecting from corresponding ends of shafts that are slotted longitudinally and cross each other, a vertical longitudinally slotted hanger, and screw clamp for securing said arms in their adjusted position, in combination with a weighing machine comprising a balance-beam, a vertically vibratory bin divided by a vertical partition into two equal compartments having discharge openings in their bottoms, a rocking-chute adapted to open and close the other of said openings alternately, an arm projecting upward from said chute at an angle striking midway between the oppositely inclined portions thereof, and trips pivoted to the side of said bin and engaging the upper end of said arm to retain it at the limit of its movement and means for actuating said trips.

9. A weighing machine comprising a hopper, having a suitable regulating valve in its bottom, transverse shafts below and at each end of the openings closed by said valve, leaves projecting from said shaft below the same, and adjusting devices for simultaneously moving said leaves toward or from each other at substantially the same angle, in combination with a weighing machine comprising a balance-beam, a vertically vibratory bin divided by a vertical partition into two equal compartments having discharge openings in their bottoms, a rocking chute adapted to open one and close the other of said openings alternately, an arm projecting upward from said chute at an angle striking midway between the oppositely inclined portions thereof, and two independent trips pivoted to the side of said bin and engaging the upper end of said arm to retain it at the limit of its movement and means for actuating said trips.

10. A weighing machine comprising a hopper, having a suitable regulating valve in its bottom, transverse shafts below and at each end of the openings closed by said valve, leaves projecting from said shaft below the same, and adjusting devices for simultaneously moving said leaves toward or from each other at substantially the same angle, in combination with a weighing machine comprising a balance-beam, a vertically vibratory bin divided by a vertical partition into two equal compartments having discharge openings in their bottoms, a rocking-chute adapted to open one and close the other of said openings alternately, an arm projecting upward from said chute at an angle striking midway between the oppositely inclined portions thereof, and a trip consisting of a horizontal branch and a downward inclined portion pivoted at one end to the side of said bin and engaging the upper end of said arm to retain it at the limit of its movement and stationary means independent of said bin for actuating said trip.

11. A weighing machine comprising a hopper, having a suitable regulating valve in its bottom, transverse shafts below and at each end of the opening closed by said valve, leaves projecting from said shafts, arms projecting from corresponding ends of shafts that are slotted longitudinally and cross each other, a vertical longitudinally slotted hanger, and screw clamp, for securing said arms in their adjusted position, in combination with a weighing machine comprising a balance-beam, a vertically vibratory bin divided by a vertical partition into two equal compartments having discharge openings in their bottoms, a rocking-chute adapted to open and close the other of said openings alternately, an arm projecting upward from said chute at an angle striking midway between the oppositely inclined portions thereof, and two independent trips pivoted to the side of said bin and engaging the upper end of said arm to retain it at the limit of its movement and means for actuating said trips.

12. A weighing machine comprising a hopper, having a suitable regulating valve in its bottom, transverse shafts below and at each end of the opening closed by said valve, leaves projecting from said shafts, arms projecting from corresponding ends of shafts that are slotted longitudinally and cross each other, a vertical longitudinally slotted hanger, and screw clamp for securing said arms in their adjusted position, in combination with a weighing machine comprising a balance-beam, a vertically vibratory bin divided by a vertical partition into two equal compartments having discharge openings in their bottoms, a rocking-chute adapted to open and close the other of said openings alternately, an arm projecting upward from said chute at an angle striking midway between the oppositely inclined portions thereof, and a trip consisting of a horizontal branch and a downward inclined portion pivoted at one end to the side of said bin engaging the upper end of said arm to retain it at the limit of its movement and stationary means independent of said bin for actuating said trip.

In testimony whereof I have hereunto set my hand and seal this 22nd day of December, A. D., 1908.

PETRONELLA EDTBAUER. [L. S.]

Witnesses:
 FRANK D. THOMASON,
 EDMUND EDTBAUER.